US012662961B2

(12) United States Patent　　(10) Patent No.:　US 12,662,961 B2
Agata et al.　　(45) Date of Patent:　Jun. 23, 2026

(54) GAS TURBINE CONTROL DEVICE, GAS TURBINE, AND GAS TURBINE CONTROL METHOD

(71) Applicant: MITSUBISHI HEAVY INDUSTRIES, LTD., Tokyo (JP)

(72) Inventors: Go Agata, Tokyo (JP); Hiromi Koizumi, Tokyo (JP); Mitsuhiro Karishuku, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/722,361

(22) PCT Filed: Dec. 23, 2022

(86) PCT No.: PCT/JP2022/047512
§ 371 (c)(1),
(2) Date: Jun. 20, 2024

(87) PCT Pub. No.: WO2023/140045
PCT Pub. Date: Jul. 27, 2023

(65) Prior Publication Data
US 2025/0059917 A1　　Feb. 20, 2025

(30) Foreign Application Priority Data

Jan. 24, 2022　(JP) ................................. 2022-008808

(51) Int. Cl.
*F02C 3/22*　　(2006.01)
*F02C 7/30*　　(2006.01)
(Continued)

(52) U.S. Cl.
CPC .................. *F02C 3/22* (2013.01); *F02C 7/30* (2013.01); *F02C 9/40* (2013.01); *F23D 17/002* (2013.01);
(Continued)

(58) Field of Classification Search
CPC ................... F23K 5/18; F23D 2209/30; F23R 2900/00004; F23R 2900/00016;
(Continued)

(56) References Cited

U.S. PATENT DOCUMENTS 6,256,975 B1 * 7/2001 Dobbeling ............. B64D 37/32
60/776
2009/0314001 A1 * 12/2009 Tanaka ...................... F02C 7/26
60/772

(Continued)

FOREIGN PATENT DOCUMENTS

JP　　55-29076　　3/1980
JP　　2001318716 A　*　11/2001
(Continued)

OTHER PUBLICATIONS

International Search Report issued Feb. 7, 2023 in International Application No. PCT/JP2022/047512, with English translation.

(Continued)

*Primary Examiner* — Devon C Kramer
*Assistant Examiner* — Jingchen Liu
(74) *Attorney, Agent, or Firm* — Wenderoth, Lind & Ponack, L.L.P.

(57)　　　ABSTRACT

A gas turbine control device according to at least one embodiment of the present disclosure comprises a purge gas flow rate control unit that controls the flow rate of purge gas for discharging fuel gas remaining inside the gas turbine to the outside of the gas turbine. The purge gas flow rate control unit controls the flow rate of the purge gas on the basis of a parameter related to the intake air quantity from a gas turbine inlet.

6 Claims, 3 Drawing Sheets

(51) Int. Cl.
  *F02C 9/40*         (2006.01)
  *F23D 17/00*        (2006.01)
(52) U.S. Cl.
  CPC .................... *F23D 2209/30* (2013.01); *F23D 2900/00016* (2013.01); *F23R 2900/00004* (2013.01)
(58) Field of Classification Search
  CPC ...... F02C 7/30; F02C 7/26; F02C 3/22; F02C 9/40; F01D 21/00; F01D 21/06
  See application file for complete search history.

(56)                    References Cited

U.S. PATENT DOCUMENTS

| | | | |
|---|---|---|---|
| 2012/0036863 A1* | 2/2012 | Kirzhner | F02C 7/22 |
| | | | 60/776 |
| 2012/0240591 A1* | 9/2012 | Snider | F01K 23/101 |
| | | | 60/39.094 |
| 2014/0099584 A1 | 4/2014 | Bobba et al. | |
| 2017/0074174 A1 | 3/2017 | D'Alessandro et al. | |
| 2017/0254270 A1 | 9/2017 | Okada et al. | |
| 2018/0058337 A1 | 3/2018 | Alexander et al. | |

FOREIGN PATENT DOCUMENTS

| | | |
|---|---|---|
| JP | 2002-013418 | 1/2002 |
| JP | 2008-082262 | 4/2008 |
| JP | 2010-065579 | 3/2010 |
| JP | 2012-017957 | 1/2012 |
| JP | 2014-077630 | 5/2014 |
| JP | 2016-048044 | 4/2016 |
| JP | 2020-143672 | 9/2020 |

OTHER PUBLICATIONS

International Preliminary Report on Patentability mailed Feb. 7, 2023 in International Application No. PCT/JP2022/047512, with English translation.
Office Action issued Jul. 15, 2025 in corresponding Japanese Patent Application No. 2023-575157, with machine translation, 14 pages.
Office Action dated Oct. 7, 2025 issued in corresponding Japanese Patent Application No. 2023-575157, with machine translation, 9 pages.

* cited by examiner

GAS TURBINE CONTROL DEVICE, GAS TURBINE, AND GAS TURBINE CONTROL METHOD

TECHNICAL FIELD

The present disclosure relates to a gas turbine control device, a gas turbine, and a gas turbine control method.

The present application claims priority based on Japanese Patent Application No. 2022-008808 filed in Japan on Jan. 24, 2022, the contents of which are incorporated herein by reference.

BACKGROUND ART

In a gas turbine that uses a gaseous fuel as a fuel, for example, in a case of stopping the gas turbine, in order to prevent the fuel remaining in a fuel pipe from being combusted in the fuel pipe, the fuel pipe is purged with an inert gas such as nitrogen to purge the gaseous fuel in the fuel pipe with the inert gas (see, for example, Japanese Unexamined Patent Application Publication No. 2008-082262).

CITATION LIST

Patent Literature

[PTL 1] Japanese Unexamined Patent Application Publication No. 2008-082262

SUMMARY OF INVENTION

Technical Problem

However, for example, in a case where the purge with the inert gas is performed in a disorderly manner in a situation where an intake air amount is decreasing, such as during tripping of the gas turbine, there is a risk that a region where a concentration of the fuel gas is relatively high is generated on a downstream side of a combustor, which may cause unintended ignition or the like. This is significant, for example, in a case where a fuel having relatively high combustibility, such as hydrogen, is used.

At least one embodiment of the present disclosure is to provide a gas turbine control device, a gas turbine, and a gas turbine control method, with which the safety of the gas turbine can be improved in view of the above-described circumstances.

Solution to Problem (1) A gas turbine control device according to at least one embodiment of the present disclosure is a gas turbine control device, the control device including: a purge gas flow rate control unit that controls a flow rate of a purge gas for discharging a fuel gas remaining inside the gas turbine to an outside of the gas turbine, in which the purge gas flow rate control unit controls the flow rate of the purge gas based on a parameter related to an intake air amount from a gas turbine inlet.

(2) A gas turbine according to at least one embodiment of the present disclosure includes: a gas turbine control device having the above-described (1) configuration, a flow rate regulation device that regulates a flow rate of a purge gas, and a turbine that rotates with a combustion gas generated by combusting a fuel gas.

(3) A gas turbine control method according to at least one embodiment of the present disclosure is a gas turbine control method, in which a flow rate of a purge gas for discharging a fuel gas remaining inside a gas turbine to an outside of the gas turbine is controlled based on a parameter related to an intake air amount from a gas turbine inlet.

Advantageous Effects of Invention

According to at least one embodiment of the present disclosure, the safety of the gas turbine can be improved.

DESCRIPTION OF EMBODIMENTS

Figure 1:
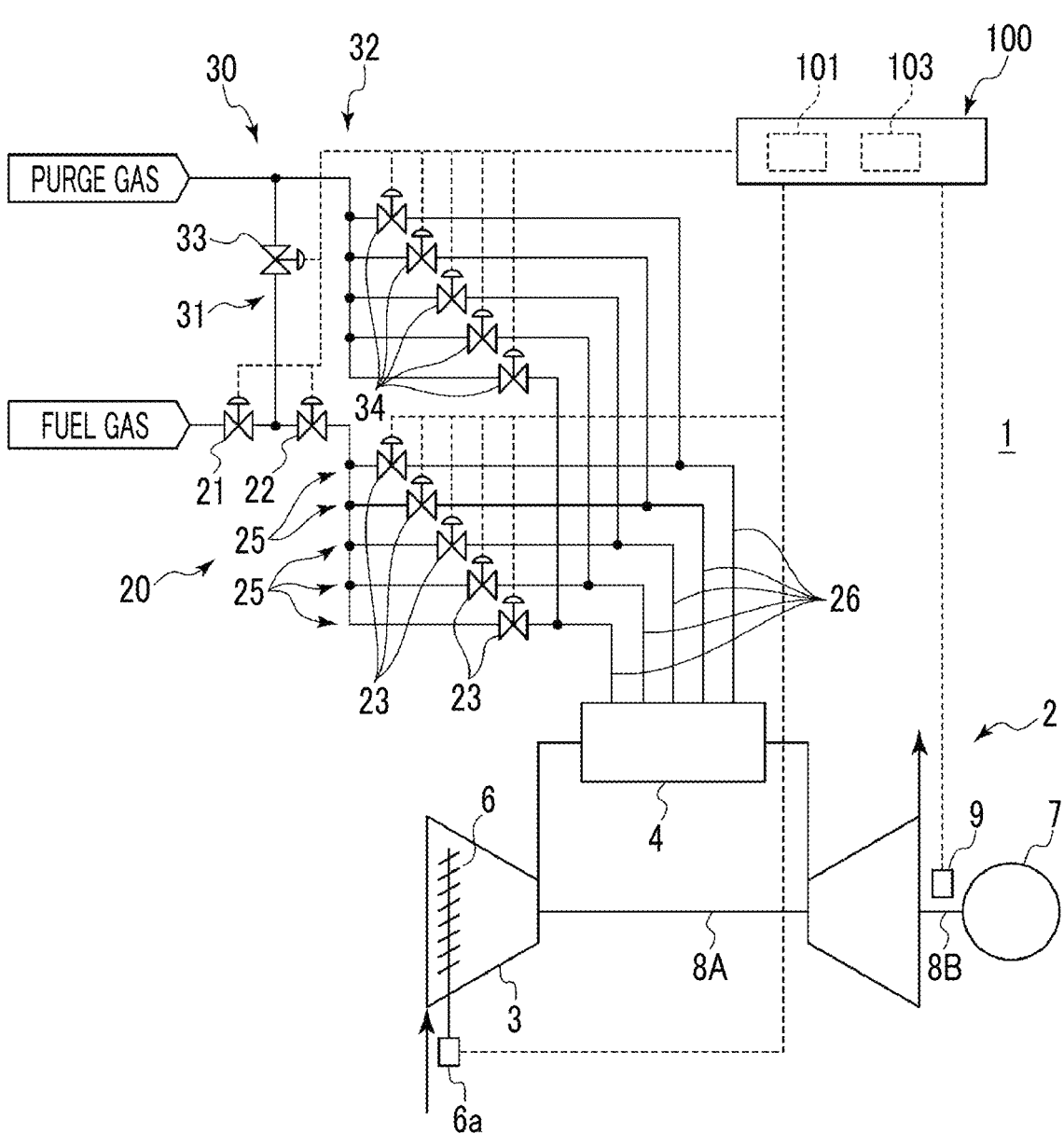
FIG. 1 is a diagram schematically showing a configuration of a gas turbine according to one embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, an expression such as "identical", "equal", or "homogeneous" representing a state where things are equal to each other does not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

Meanwhile, the expressions "being provided with", "comprising", "including", or "having" one component are not exclusive expressions excluding the presence of other components.

Overall Configuration of Gas Turbine 2

Hereinafter, an example will be described, of which a gas turbine 2 includes a control device 100 according to some embodiments. FIG. 1 is a diagram schematically showing a configuration of the gas turbine 2 according to one embodiment. As shown in FIG. 1, a power generation device 1 includes the gas turbine 2 and a generator 7.

In FIG. 1, a configuration related to regulation of a flow rate of a purge gas, which will be described later, is mainly described, and the description of other configurations is not shown.

The gas turbine 2 is a power generation gas turbine. The gas turbine 2 includes a compressor 3 for generating compressed air, a combustor 4 for generating a combustion gas using the compressed air and a fuel, a turbine 5 that is configured to be rotationally driven by the combustion gas, a fuel system 20 for supplying the fuel to the combustor 4, and a purge gas system 30 for supplying the purge gas to a fuel pipe 26 described below of the fuel system 20.

The compressor 3 is connected to the turbine 5 via a rotary shaft 8A. The compressor 3 is rotationally driven by rotational energy of the turbine 5 to generate compressed air. An inlet guide vane 6 is provided on an inlet side of the compressor 3. An inflow rate of the air is regulated by changing an opening degree of the inlet guide vane 6 by means of an actuator 6a. The opening degree of the inlet guide vane 6 is controlled based on an inlet guide vane opening degree control command IGVCSO. The compressed air generated by the compressor 3 is supplied to the combustor 4.

The combustor 4 is supplied with the compressed air generated by the compressor 3 and the fuel, and the fuel is combusted to generate a combustion gas, which is a working fluid of the turbine 5. A flow rate of the fuel supplied to the combustor 4 is regulated by a fuel flow rate regulation valve 23 in which an opening degree is regulated in accordance with a fuel flow rate command. The combustion gas is sent from the combustor 4 to the turbine 5 on a rear stage.

The fuel flow rate regulation valve 23 is controlled by the control device 100 according to some embodiments, as will be described below.

The turbine 5 is driven by the combustion gas generated in the combustor 4. The turbine 5 is connected to the generator 7 by a rotary shaft 8B. The generator 7 is configured to generate electricity by means of the rotational energy of the turbine 5.

Fuel System 20

In the gas turbine 2 according to one embodiment, the fuel system 20 is configured to supply gaseous fuel (fuel gas) as the fuel. The fuel system 20 according to one embodiment includes a shut-off valve 21 for shutting off a supply of the fuel gas to be supplied to the combustor 4, a pressure regulation valve 22 that is disposed downstream of the shut-off valve 21 and that is for regulating a pressure of the fuel gas to be supplied to the combustor 4, and a plurality of fuel flow rate regulation valves 23 that are disposed downstream of the pressure regulation valve 22 and that are for regulating the flow rate of the fuel gas to be supplied to the combustor 4.

In the fuel system 20 according to one embodiment, an example is shown, in which, for example, five fuel supply systems 25 for supplying the fuel gas to the combustor 4 are provided. However, the fuel supply system 25 may have another aspect. In addition, in FIG. 1, only one combustor 4 is shown as a representative example, but the gas turbine 2 may be configured to include a plurality of combustors 4, with each combustor 4 being provided with each fuel supply system 25.

In the gas turbine 2 according to one embodiment, the fuel flow rate regulation valve 23 is provided in each of the fuel pipes 26 branched in the fuel supply system 25 downstream of the pressure regulation valve 22.

The shut-off valve 21 includes an actuator (not shown) for opening and closing the shut-off valve 21.

The pressure regulation valve 22 includes an actuator (not shown) for changing a set pressure of the pressure regulation valve 22.

Each fuel flow rate regulation valve 23 has an actuator (not shown) for regulating the flow rate of the fuel gas flowing through each fuel flow rate regulation valve 23.

In the fuel system 20 according to one embodiment, the shut-off valve 21, the pressure regulation valve 22, and each fuel flow rate regulation valve 23 are controlled by the control device 100 according to some embodiments.

Purge Gas System 30

In the gas turbine 2 according to one embodiment, the purge gas system 30 includes a first purge gas supply system 31 for supplying a purge gas to the fuel pipe 26 between the shut-off valve 21 and the pressure regulation valve 22, and five second purge gas supply systems 32 for supplying the purge gas to the fuel pipe 26 on a downstream side of the fuel flow rate regulation valve 23 in each fuel supply system 25.

In the purge gas system 30 according to one embodiment, the first purge gas supply system 31 is provided with a flow rate regulation valve 33 for regulating the flow rate of the purge gas supplied to the fuel pipe 26, and each of the second purge gas supply systems 32 is provided with a flow rate regulation valve 34 for regulating the flow rate of the purge gas supplied to the fuel pipe 26.

Each of the flow rate regulation valves 33 and 34 has an actuator (not shown) for regulating the flow rate of the purge gas flowing through each of the flow rate regulation valves 33 and 34.

Each of the flow rate regulation valves 33 and 34 is a flow rate regulation device for regulating a purge flow rate Qp.

In the purge gas system 30 according to one embodiment, each of the flow rate regulation valves 33 and 34 is controlled by the control device 100 according to some embodiments.

In the purge gas system 30 according to one embodiment, the purge gas is an inert gas such as nitrogen. In the following description, the purge gas supplied from the purge gas system 30 will be described as nitrogen.

Control Device 100

The control device 100 according to some embodiments includes a processor 101 that executes various types of arithmetic processing, and a memory 103 that stores various types of data processed by the processor 101 in a non-temporary or temporary manner. The processor 101 is implemented by a CPU, a GPU, an MPU, a DSP, various other arithmetic devices, a combination thereof, or the like. The memory 103 is implemented by a ROM, a RAM, a flash memory, a combination thereof, or the like.

Figure 2:
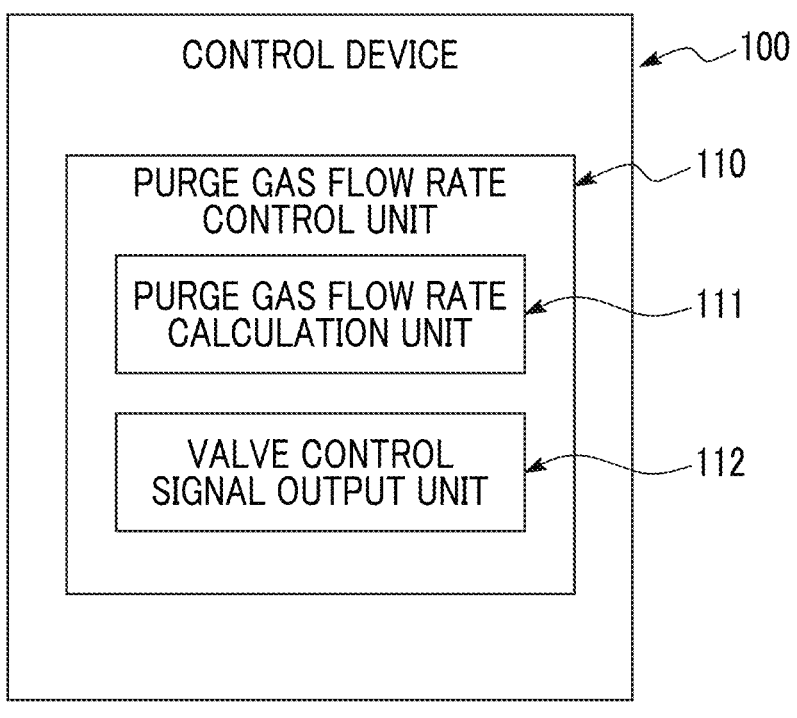
FIG. 2 is a functional block diagram of a control device according to some embodiments.

FIG. 2 is a functional block diagram of the control device 100 according to some embodiments. In FIG. 2, only the functional blocks related to the regulation of the flow rate of the purge gas, which will be described later, are described, and the description of the other functional blocks is not shown.

The control device 100 according to some embodiments includes a purge gas flow rate control unit 110. The purge gas flow rate control unit 110 includes a purge gas flow rate calculation unit 111 and a valve control signal output unit 112. The purge gas flow rate control unit 110, the purge gas flow rate calculation unit 111, and the valve control signal output unit 112 are functional blocks implemented by the processor 101 executing a program stored in the memory 103.

The purge gas flow rate calculation unit 111 calculates the flow rate (purge flow rate Qp) of the purge gas supplied from the purge gas system 30 to the fuel pipe 26, as will be described below.

The valve control signal output unit 112 outputs a control signal to an actuator (not shown) of each flow rate regulation valve 34 such that the purge is performed with the purge flow rate Op calculated by the purge gas flow rate calculation unit 111.

The details of the specific processing in the control device 100 will be described later.

Purge with Purge Gas

For example, in a case where the purge with the purge gas is performed in a disorderly manner in a situation where an intake air amount is decreasing, such as during tripping of the gas turbine 2, there is a risk that a region where a concentration of the fuel gas is relatively high is generated on a downstream side of the combustor 4, which may cause unintended ignition or the like. This is significant, for example, in a case where a fuel having relatively high combustibility, such as hydrogen, is used.

Therefore, in the gas turbine 2 according to one embodiment, the purge gas is supplied from the purge gas system 30 to the fuel pipe 26 as follows.

Figure 3:
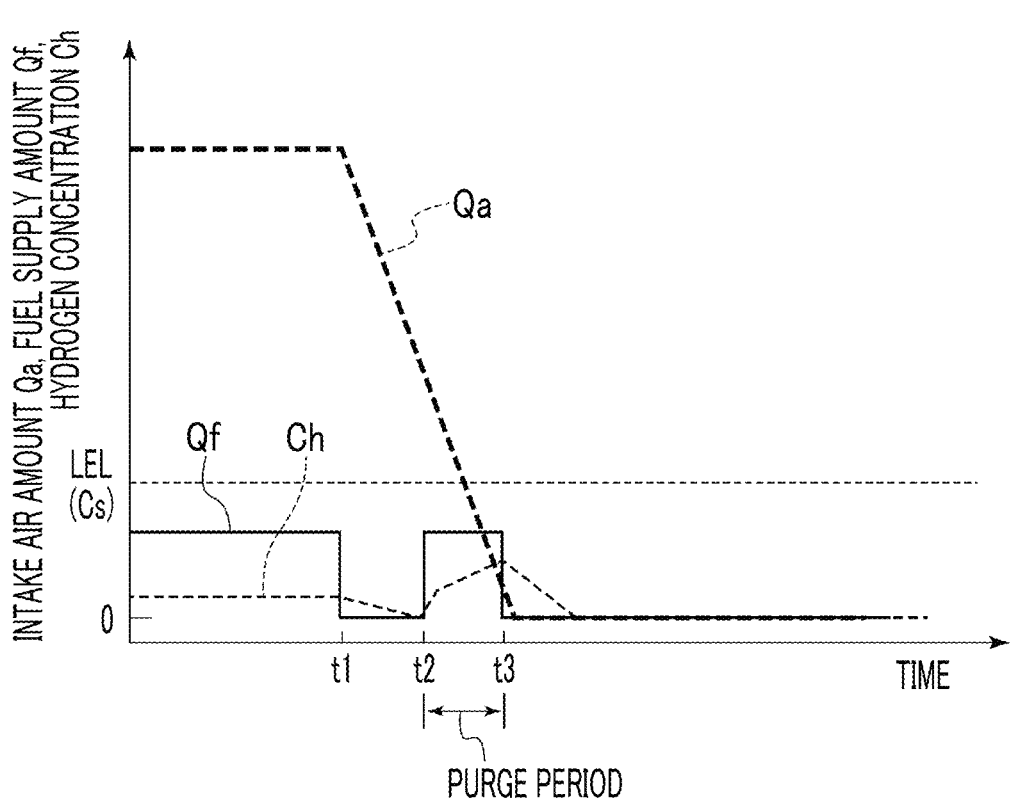
FIG. 3 is a graph for describing one embodiment of a purge gas supply method.

FIG. 3 is a graph for describing one embodiment of a purge gas supply method.

Figure 4:
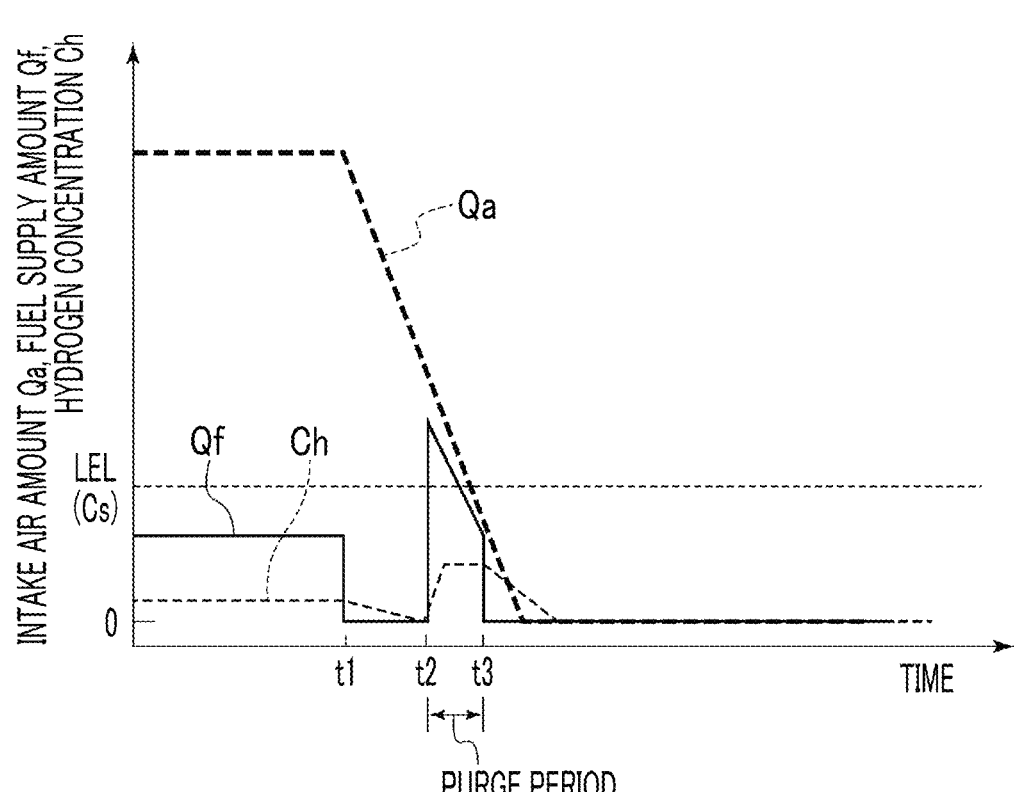
FIG. 4 is a graph for describing another embodiment of the purge gas supply method.

FIG. 4 is a graph for describing another embodiment of the purge gas supply method.

In the graphs of FIGS. 3 and 4, a transition of an intake air amount Qa from a turbine inlet, a fuel supply amount Qf, and a hydrogen concentration Ch in a space on the downstream side of the combustor 4 is shown. In the following description, it is assumed that the fuel gas contains a relatively large amount of hydrogen.

In addition, in the following description, the intake air amount Qa from the turbine inlet is also simply referred to as the intake air amount Qa, and a the hydrogen concentration Ch in the space on the downstream side of the combustor 4 is also simply referred to as the hydrogen concentration Ch.

In the graphs of FIGS. 3 and 4, the intake air amount Qa from the turbine inlet is represented by thick broken lines, the fuel supply amount Qf is represented by thin solid lines, and the hydrogen concentration Ch is represented by thin broken lines. In addition, in the graphs of FIGS. 3 and 4, the hydrogen concentration at which a lower explosion limit LEL is reached is represented by a broken line parallel to a horizontal axis of the graphs.

In addition, in the graphs of FIGS. 3 and 4, a zero point position of a vertical axis is set at a position away from the horizontal axis in order to avoid overlapping between each graph line and the horizontal axis.

Each of times t1, t2, and t3, which will be described later, is an occurrence time of an event which will be described later, and a length of time between each of the times t1, t2, and t3 is not always the same between the graph of FIG. 3 and the graph of FIG. 4. That is, even in a case in which a time t1 is the same time in the graph of FIG. 3 and the graph of FIG. 4, a time t2 does not have to be the same time in the graph of FIG. 3 and the graph of FIG. 4. A time t3 is not necessarily the same time as the time t3 in the graph of FIG. 3 and the graph of FIG. 4.

In the graphs of FIGS. 3 and 4, a case is described where tripping occurs in the gas turbine 2 operated at a rated rotation speed, as an example of a case where the purge gas is supplied from the purge gas system 30 to the fuel pipe 26.

In the purge gas supply method according to some embodiments shown in FIGS. 3 and 4, in a case where tripping occurs at the time t1, a gas turbine rotation speed starts to gradually decrease because the gas turbine rotation speed is rotated by inertia from the time t1.

In the purge gas supply method according to some embodiments shown in FIGS. 3 and 4, the supply of the fuel gas is stopped at the time t1, and thus the fuel supply amount Qf is zero from the time t1 when the tripping occurs to the time t2 when the purge to the fuel pipe 26 with the purge gas is started. Therefore, the hydrogen concentration Ch gradually decreases from the time t1 to the time t2.

In a case where the purge of the fuel pipe 26 with the purge gas is started at the time t2, the fuel gas remaining in the fuel pipe 26 is pushed out by the purge gas and is blown out from a fuel nozzle (not shown) of the combustor 4, and thus the hydrogen concentration Ch increases again. At this time, the flow rate of the fuel gas blown out from the fuel nozzle (not shown) of the combustor 4 is equal to the flow rate (purge flow rate Qp) of the purge gas supplied from the purge gas system 30 to the fuel pipe 26.

Therefore, in a case where the purge flow rate Qp is too large, the fuel gas remaining in the fuel pipe 26 is pushed out at once by the purge gas, and there is a risk that the hydrogen concentration Ch exceeds the lower explosion limit LEL.

Case of Purge Gas Supply Method of One Embodiment Shown in FIG. 3

Therefore, in the purge gas supply method according to one embodiment shown in FIG. 3, an upper limit is set for the purge flow rate Qp, and the hydrogen concentration Ch is set to not exceed a reference concentration Cs (for example, the lower explosion limit LEL).

For example, in the purge gas supply method according to one embodiment shown in FIG. 3, the purge is performed at a constant flow rate during a purge period such that the purge flow rate Qp is an upper limit threshold value Thu.

Here, the upper limit threshold value Thu of the purge flow rate Qp is a value such that the hydrogen concentration Ch does not exceed the reference concentration Cs even at a timing at which the intake air amount Qa is the smallest during the purge period. For example, in the example shown in FIG. 3, the timing at which the intake air amount Qa is the smallest during the purge period is the time t3 at which the purge is ended.

In the purge gas supply method according to one embodiment shown in FIG. 3, a length of the purge period (t3-t2), that is, a time tp required for the purge, is substantially equal to a value (V/Qpa) obtained by dividing a volume V of the fuel pipe 26 to be purged by an average purge flow rate Qpa during the purge period (tp≈V/Qpa).

Therefore, in the purge gas supply method according to one embodiment shown in FIG. 3, in a case where the purge is ended at the time t3, the upper limit threshold value Thu of the purge flow rate Qp can be obtained from the intake air amount Qa at the time t3 obtained from the turbine rotation speed at the time t3.

Then, the time tp required for purge can be obtained from the obtained upper limit threshold value Thu, and at which timing the purge should be started (that is, the time t2) can be known.

It should be noted that, in a case of calculating the intake air amount Qa at the time t3, the calculation accuracy of the intake air amount Qa at the time t3 can be improved by taking the opening degree of the inlet guide vane 6 into consideration.

That is, in the purge gas supply method according to one embodiment shown in FIG. 3, the purge gas flow rate calculation unit 111 of the purge gas flow rate control unit 110 obtains the purge flow rate Qp based on a parameter related to the intake air amount Qa. Here, the parameter related to the intake air amount Qa includes a parameter related to the gas turbine rotation speed. The parameter related to the gas turbine rotation speed may be, for example, a detection value of a rotation speed sensor 9 (see FIG. 1) that detects the gas turbine rotation speed, or may be a control value of the gas turbine rotation speed. In addition, the parameter related to the gas turbine rotation speed may be data on a transition of the gas turbine rotation speed after the tripping, which is obtained by being measured in advance or being obtained in advance by calculation.

In the purge gas supply method according to one embodiment shown in FIG. 3, in a case in which the purge gas flow rate calculation unit 111 of the purge gas flow rate control unit 110 receives, for example, a trip signal indicating that the gas turbine 2 has tripped, the purge gas flow rate calculation unit 111 of the purge gas flow rate control unit 110 obtains the intake air amount Qa at the time t3 at which the purge is ended from the data of the transition of the gas turbine rotation speed after the tripping, for example, as described above.

Then, the purge gas flow rate calculation unit 111 calculates the upper limit threshold value Thu of the purge flow rate Qp from the intake air amount Qa at the time t3.

The purge gas flow rate calculation unit 111 calculates the time tp required for the purge from the obtained upper limit threshold value Thu to calculate the time t2 at which the purge starts.

The purge gas flow rate calculation unit 111 calculates a valve opening degree of each of the flow rate regulation valves 34 corresponding to the upper limit threshold value Thu of the purge flow rate Qp. Then, the purge gas flow rate calculation unit 111 outputs the information on the valve opening degree described above to the valve control signal output unit 112 at the timing of the time t2.

The valve control signal output unit 112 generates and outputs a control signal for driving an actuator (not shown) of the flow rate regulation valve 34 based on information on the valve opening degree received from the purge gas flow rate calculation unit 111.

In each flow rate regulation valve 34, an actuator (not shown) regulates an opening degree of each flow rate regulation valve 34 by receiving the control signal. As a result, the purge gas is supplied to each fuel pipe at the desired purge flow rate Qp.

In the purge gas supply method according to one embodiment shown in FIG. 3, the purge gas is supplied at a flow rate taking into consideration the intake air amount Qa from the gas turbine inlet, so that it is possible to suppress occurrence of the region where the concentration of the fuel gas is relatively high on the downstream side of the combustor 4. As a result, unintended ignition or the like can be suppressed, so that the safety of the gas turbine 2 can be improved.

In addition, since the parameter related to the intake air amount Qa includes the parameter related to the gas turbine rotation speed, the intake air amount Qa can be relatively easily calculated.

In addition, a parameter related to the inlet guide vane opening degree may be included in the parameter related to the intake air amount Qa. The parameter related to the inlet guide vane opening degree may be, for example, the opening degree of the inlet guide vane 6, that is, information on a drive position of an actuator 6a, or may be the inlet guide vane opening degree control command IGVCSO.

As a result, the calculation accuracy of the intake air amount Qa can be improved.

As described above, in the purge gas supply method according to one embodiment shown in FIG. 3, the purge gas flow rate control unit 110 may control the purge flow rate Qp not to exceed the upper limit threshold value Thu of the purge flow rate Qp corresponding to the parameter related to the intake air amount Qa.

As a result, the purge flow rate Qp is controlled not to exceed the upper limit threshold value Thu, and it is possible to suppress the occurrence of the region where the concentration of the fuel gas is relatively high on the downstream side of the combustor 4.

In addition, in the purge gas supply method according to one embodiment shown in FIG. 3, the upper limit threshold value Thu can be set such that the hydrogen concentration Ch is less than the lower explosion limit LEL of the fuel gas even in a case of the smallest intake air amount Qa among the intake air amounts Qa during the purge period.

As a result, the certainty of suppressing the occurrence of the region is improved, where the concentration of the fuel gas is relatively high on the downstream side of the combustor 4.

In the purge gas supply method according to one embodiment shown in FIG. 3, the purge flow rate Qp may be set to be constant during the purge period.

That is, in the purge gas supply method according to one embodiment shown in FIG. 3, the purge gas flow rate control unit 110 may control the purge flow rate Qp to be constant during the purge period.

As a result, a control content in the control device 100 that controls each flow rate regulation valve 34 as will be described below can be simplified, and a load on the processor 101 or the like in the control device 100 can be suppressed.

In the purge gas supply method according to one embodiment shown in FIG. 3, the purge flow rate Qp based on the parameter related to the intake air amount Qa described above may be controlled during the tripping of the gas turbine 2.

That is, in the purge gas supply method according to one embodiment shown in FIG. 3, the purge gas flow rate control unit 110 may start the control of the purge flow rate Qp based on the parameter related to the intake air amount Qa described above during the tripping of the gas turbine 2.

As a result, it is possible to suppress the occurrence of the region where the concentration of the fuel gas is relatively high on the downstream side of the combustor 4 during the tripping of the gas turbine 2. Therefore, unintended ignition or the like during the tripping of the gas turbine 2 can be suppressed, so that the safety during the tripping of the gas turbine 2 can be improved.

In the purge gas supply method according to one embodiment shown in FIG. 3, the purge flow rate Qp may be changed within a range not exceeding the upper limit threshold value Thu of the flow rate of the purge gas during the purge period.

After the end of the purge period, that is, after the time t3, the fuel gas is no longer blown out from the fuel nozzle (not shown) of the combustor 4, so that the hydrogen concentration Ch gradually decreases.

Case of Purge Gas Supply Method of Another Embodiment Shown in FIG. 4

In the purge gas supply method according to another embodiment shown in FIG. 4, the purge flow rate Qp is changed in accordance with the change in the intake air amount Qa that changes with the lapse of time. That is, in the purge gas supply method according to another embodiment shown in FIG. 4, the purge flow rate Qp is increased or decreased in accordance with the increase or decrease of the intake air amount Qa within the range in which the hydrogen concentration Ch does not exceed the reference concentration Cs during the purge period.

Specifically, the purge gas flow rate calculation unit 111 of the purge gas flow rate control unit 110 calculates the purge flow rate Qp based on a function fx in which the purge flow rate Qp is increased or decreased in accordance with the increase or decrease of the intake air amount Qa. That is, the function fx is a function capable of calculating the purge flow rate Qp in accordance with the intake air amount Qa and capable of calculating the purge flow rate such that the purge flow rate Qp decreases as the intake air amount Qa decreases.

In the purge gas supply method according to another embodiment shown in FIG. 4, the function fx is a function in which the parameter related to the intake air amount Qa is associated with the flow rate of the purge gas.

In the purge gas supply method according to another embodiment shown in FIG. 4, the parameter related to the intake air amount is the same as that in the purge gas supply method according to one embodiment shown in FIG. 3.

The function fx is represented, for example, as the following Expression (1) in a case in which the parameter related to the intake air amount Qa is set to Pa.

$$fx = f(Pa) \qquad (1)$$

In the purge gas supply method according to another embodiment shown in FIG. 4, in a case in which the purge gas flow rate calculation unit 111 receives, for example, a trip signal indicating that the gas turbine 2 has tripped, the purge gas flow rate calculation unit 111 calculates the purge flow rate Qp based on the function fx as described above.

The purge gas flow rate calculation unit 111 calculates the time tp required for the purge from the calculated purge flow rate Qp to calculate the time t2 at which the purge starts.

The purge gas flow rate calculation unit 111 calculates the valve opening degree of each of the flow rate regulation valves 34 corresponding to the calculated purge flow rate Qp. Then, the purge gas flow rate calculation unit 111 starts the output of the information on the valve opening degree described above to the valve control signal output unit 112 at the timing of the time t2. The purge gas flow rate calculation unit 111 repeatedly executes calculation of the purge flow rate Qp based on the function fx and calculation of the valve opening degree of each of the flow rate regulation valves 34 corresponding to the calculated purge flow rate Qp, and output of the information on the calculated valve opening degree to the valve control signal output unit 112 until the time t3.

The valve control signal output unit 112 generates and outputs a control signal for driving an actuator (not shown) of the flow rate regulation valve 34 based on information on the valve opening degree received from the purge gas flow rate calculation unit 111.

In each flow rate regulation valve 34, an actuator (not shown) regulates an opening degree of each flow rate regulation valve 34 by receiving the control signal. As a result, the purge gas is supplied to each fuel pipe at the desired purge flow rate Qp.

In the purge gas supply method according to another embodiment shown in FIG. 4, since the purge flow rate Qp can be set according to the intake air amount Qa, the purge can be completed relatively quickly while suppressing unintended ignition or the like as compared with a case in which the purge flow rate Op is set regardless of the intake air amount Qa.

That is, in the purge gas supply method according to another embodiment shown in FIG. 4, the purge gas flow rate calculation unit 111 of the purge gas flow rate control unit 110 obtains the purge flow rate Qp based on the parameter related to the intake air amount Qa. Here, the parameter related to the intake air amount Qa includes a parameter related to the gas turbine rotation speed. The parameter related to the gas turbine rotation speed may be, for example, a detection value of a rotation speed sensor 9 (see FIG. 1) that detects the gas turbine rotation speed, or may be a control value of the gas turbine rotation speed. In addition, the parameter related to the gas turbine rotation speed may be data on a transition of the gas turbine rotation speed after the tripping, which is obtained by being measured in advance or being obtained in advance by calculation.

Accordingly, the purge gas is supplied at a flow rate in consideration of the intake air amount Qa from the gas turbine inlet, so that the occurrence of the region where the concentration of the fuel gas is relatively high on the downstream side of the combustor 4 can be suppressed. As a result, unintended ignition or the like can be suppressed, so that the safety of the gas turbine 2 can be improved.

In addition, since the parameter related to the intake air amount Qa includes the parameter related to the gas turbine rotation speed, the intake air amount Qa can be relatively easily calculated.

In addition, a parameter related to the inlet guide vane opening degree may be included in the parameter related to the intake air amount Qa. The parameter related to the inlet guide vane opening degree may be, for example, the opening degree of the inlet guide vane 6, that is, information on a drive position of an actuator 6a, or may be the inlet guide vane opening degree control command IGVCSO.

As a result, the calculation accuracy of the intake air amount Qa can be improved.

In the purge gas supply method according to another embodiment shown in FIG. 4, the purge flow rate Qp may be calculated such that the concentration of the fuel gas inside the gas turbine during the purge period is less than the lower explosion limit LEL of the fuel gas.

As a result, the safety of the gas turbine can be further improved.

In the purge gas supply method according to another embodiment shown in FIG. 4, the purge flow rate Qp based on the parameter related to the intake air amount Qa described above may be controlled during the tripping of the gas turbine 2.

That is, in the purge gas supply method according to another embodiment shown in FIG. 4, the purge gas flow rate control unit 110 may start the control of the purge flow rate Qp based on the parameter related to the intake air amount Qa described above during the tripping of the gas turbine 2.

As a result, it is possible to suppress the occurrence of the region where the concentration of the fuel gas is relatively high on the downstream side of the combustor 4 during the tripping of the gas turbine 2. Therefore, unintended ignition or the like during the tripping of the gas turbine 2 can be suppressed, so that the safety during the tripping of the gas turbine 2 can be improved.

After the end of the purge period, that is, after the time t3, the fuel gas is no longer blown out from the fuel nozzle (not shown) of the combustor 4, so that the hydrogen concentration Ch gradually decreases.

The present disclosure is not limited to the above-described embodiments, and includes a modification of the above-described embodiments and an appropriate combination of the embodiments.

For example, although the tripping of the gas turbine 2, which is mainly operated at the rated rotation speed, has been described above, the purge flow rate Qp may be controlled as described above even in a case where the gas turbine 2 is tripped during a turn-down operation or in a case where the gas turbine 2 is tripped during start-up.

The contents described in each embodiment are understood as follows, for example.

(1) The control device 100 of the gas turbine 2 according to at least one embodiment of the present disclosure is the control device 100 of the gas turbine 2, including the purge gas flow rate control unit 110 that controls a flow rate (purge flow rate Qp) of a purge gas for discharging a fuel gas remaining inside a gas turbine to an outside of the gas turbine. The purge gas flow rate control unit 110 controls the flow rate of the purge gas based on a parameter related to the intake air amount Qa from the gas turbine inlet.

According to the above-described configuration of (1), the purge gas is supplied at the flow rate taking into consideration the intake air amount Qa from the gas turbine inlet, so that it is possible to suppress the occurrence of the region where the concentration of the fuel gas is relatively high on the downstream side of the combustor 4. As a result, unintended ignition or the like can be suppressed, so that the safety of the gas turbine 2 can be improved.

(2) In some embodiments, in the above-described configuration of (1), the purge gas flow rate control unit 110 may control the flow rate of the purge gas based on the function fx in which the parameter related to the intake air amount Qa is associated with the flow rate (purge flow rate Qp) of the purge gas.

According to the above-described configuration of (2), the flow rate (purge flow rate Qp) of the purge gas can be set according to the intake air amount Qa, so that the purge can be completed relatively quickly while suppressing unintended ignition or the like as compared with a case in which the flow rate of the purge gas is set regardless of the intake air amount Qa.

(3) In some embodiments, in the above-described configuration of (2), the purge gas flow rate control unit 110 may control the flow rate (purge flow rate Qp) of the purge gas such that a concentration of the fuel gas inside the gas turbine during a circulation period of the purge gas is less than the lower explosion limit LEL of the fuel gas.

According to the above-described configuration of (3), the safety of the gas turbine 2 can be further improved.

(4) In some embodiments, in the above-described configuration of (1), the purge gas flow rate control unit 110 may control the flow rate (purge flow rate Qp) of the purge gas to not exceed the upper limit threshold value Thu of the flow rate (purge flow rate Qp) of the purge gas corresponding to the parameter related to the intake air amount Qa.

According to the above-described configuration (4), the flow rate (purge flow rate Qp) of the purge gas is controlled such that the intake air amount Qa from the gas turbine inlet does not exceed the considered upper limit threshold value Thu, and it is possible to suppress the occurrence of the region where the concentration of the fuel gas is relatively high on the downstream side of the combustor 4.

(5) In some embodiments, in the above-described configuration of (4), the upper limit threshold value Thu may be set such that a concentration of the fuel gas inside the gas turbine is less than the lower explosion limit LEL of the fuel gas, even in a case where the intake air amount is the smallest intake amount Qa among the intake air amounts Qa during a circulation period of the purge gas.

According to the above-described configuration of (5), the certainty of suppressing the occurrence of the region where the concentration of the fuel gas is relatively high on the downstream side of the combustor 4 is improved.

(6) In some embodiments, in the above-described configuration of (5), the purge gas flow rate control unit 110 may control the flow rate (purge flow rate Qp) of the purge gas such that the flow rate (purge flow rate Qp) of the purge gas during the circulation period of the purge gas is constant.

According to the above-described configuration of (6), a control content in the purge gas flow rate control unit 110 can be simplified. As a result, the load of the processor 101 or the like in the purge gas flow rate control unit 110 can be suppressed.

(7) In some embodiments, in the configurations of any one of (1) to (6), the purge gas flow rate control unit 110 may start the control of the flow rate (purge flow rate Qp) of the purge gas based on the parameter related to the intake air amount Qa from the gas turbine inlet, in a case where tripping of the gas turbine 2 is detected.

According to the above-described configuration (7), it is possible to suppress the occurrence of the region where the concentration of the fuel gas is relatively high on the downstream side of the combustor 4 during the tripping of the gas turbine 2. As a result, unintended ignition or the like during the tripping of the gas turbine 2 can be suppressed, so that the safety during the tripping of the gas turbine 2 can be improved.

(8) In some embodiments, in any of the above-described configurations of (1) to (7), the parameter related to the intake air amount Qa may include a parameter related to a gas turbine rotation speed.

According to the above-described configuration of (8), the intake air amount Qa can be relatively easily calculated.

(9) In some embodiments, in the above-described configuration of (8), the parameter related to the intake air amount Qa may include a parameter related to an inlet guide vane opening degree.

According to the above-described configuration of (9), the calculation accuracy of the intake air amount Qa can be improved.

(10) The gas turbine 2 according to at least one embodiment of the present disclosure includes the control device 100 of the gas turbine 2 having any of the configurations of (1) to (9), the flow rate regulation device (the flow rate regulation valve 34) that regulates the flow rate of the purge gas (the purge flow rate Qp), and the turbine 5 that rotates with a combustion gas generated by combustion of the fuel gas.

According to the above-described configuration of (10), since the control device 100 of the gas turbine 2 having any one of the configurations (1) to (9) is provided, the occurrence of the region where the concentration of the fuel gas is relatively high on the downstream side of the combustor 4 can be suppressed. As a result, unintended ignition or the like can be suppressed, so that the safety of the gas turbine 2 can be improved.

(11) A control method of the gas turbine 2 according to at least one embodiment of the present disclosure is a control method of the gas turbine 2, in which a flow rate (purge flow rate Qp) of a purge gas for discharging fuel gas remaining inside the gas turbine to an outside of the gas turbine is controlled, based on a parameter related to the intake air amount Qa from a gas turbine inlet.

According to the above-described method of (11), since the purge gas is supplied at the flow rate taking into consideration the intake air amount Qa from the gas turbine inlet, the occurrence of the region where the concentration of the fuel gas is relatively high on the downstream side of the combustor can be suppressed. As a result, unintended ignition or the like can be suppressed, so that the safety of the gas turbine 2 can be improved.

REFERENCE SIGNS LIST

2: gas turbine
3: compressor
5: turbine
6: inlet guide vane
20: fuel system
26: fuel pipe
30: purge gas system
33, 34: flow rate regulation valve
100: control device
101: processor
103: memory
110: purge gas flow rate control unit
111: purge gas flow rate calculation unit
112: valve control signal output unit
The invention claimed is:

1. A purge device of a gas turbine, comprising:
a purge gas system for supplying purge gas to a fuel pipe which supplies fuel gas to a combustor of the gas turbine, in order to discharge fuel gas remaining inside the fuel pipe to an outside of the gas turbine; and
a control device including a processor and a memory,
wherein using the memory, the processor controls a flow rate of the purge gas provided to the fuel pipe based on a parameter related to an intake air amount from a gas turbine inlet, and
wherein the parameter includes:
a parameter related to a gas turbine rotation speed; and
a parameter related to an opening degree of an inlet guide vane provided at the gas turbine inlet, and the parameter is a drive position of an actuator of the inlet guide vane or an inlet guide vane opening degree control command,
wherein using the memory, the processor controls the flow rate of the purge gas to not exceed an upper limit threshold value of the flow rate of the purge gas corresponding to the parameter related to the intake air amount,
wherein the upper limit threshold value of the flow rate of the pure gas is set, such that a concentration of the fuel gas inside the gas turbine remains less than a lower explosion limit of the fuel gas during a circulation period of the purge gas, wherein the concentration of the fuel gas inside the gas turbine reaches a maximum value at the end of the circulation period of the purge gas when the purge gas is no longer provided to the fuel pipe.

2. The purge device of the gas turbine according to claim 1, wherein using the memory, the processor controls the flow rate of the purge gas such that the flow rate of the purge gas during the circulation period of the purge gas is constant.

3. The purge device of the gas turbine according to claim 1, wherein using the memory, the processor starts the control of the flow rate of the purge gas based on the parameter related to the intake air amount from the gas turbine inlet, in a case where tripping of the gas turbine is detected.

4. A gas turbine comprising:
the purge device of the gas turbine according to claim 1;
a flow rate regulation valve that regulates the flow rate of the purge gas; and
a turbine that rotates with a combustion gas generated by combustion of the fuel gas.

5. The purge device of the gas turbine control device according to claim 1, wherein using the memory, the processor controls the flow rate of the purge gas to be the upper limit threshold value of the flow rate of the purge gas.

6. A purge method for discharging fuel gas remaining inside a fuel pipe, which supplies the fuel gas to a combustor of a gas turbine, to an outside of the gas turbine, the purge method comprising:
controlling a flow rate of a purge gas supplied to the fuel pipe in order to discharge the fuel gas remaining inside the fuel pipe to the outside of the gas turbine, based on a parameter related to an intake air amount from a gas turbine inlet,
wherein the parameter includes:
a parameter related to a gas turbine rotation speed; and
a parameter related to an opening degree of an inlet guide vane provided at the gas turbine inlet, and the parameter is a drive position of an actuator of the inlet guide vane or an inlet guide vane opening degree control command,
controlling the flow rate of the purge gas to not exceed an upper limit threshold value of the flow rate of the purge gas corresponding to the parameter related to the intake air amount,
setting the upper limit threshold value of the flow rate of the purge gas, such that a concentration of the fuel gas inside the gas turbine remains less than a lower explosion limit of the fuel gas during a circulation period of the purge gas,
wherein the concentration of the fuel gas inside the gas turbine reaches a maximum value at the end of the circulation period of the purge gas when the purge gas is no longer provided to the fuel pipe.

* * * * *